United States Patent [19]

Billings

[11] 3,943,688
[45] Mar. 16, 1976

[54] HARVESTING MACHINE

[76] Inventor: Thomas A. Billings, 3415 Elder St., Titusville, Fla. 32780

[22] Filed: Oct. 4, 1974

[21] Appl. No.: 512,137

[52] U.S. Cl. .............................. 56/328 R; 239/78
[51] Int. Cl.² ...................................... A01D 46/00
[58] Field of Search .............. 239/77, 78, 227, 380; 56/328 R, 328 TS, 329

[56] References Cited
UNITED STATES PATENTS

| | | | |
|---|---|---|---|
| 2,643,155 | 6/1953 | Wright et al. | 239/78 |
| 3,114,998 | 12/1963 | Weisser | 56/329 |
| 3,153,510 | 10/1964 | Brannfors et al. | 239/165 X |
| 3,164,324 | 1/1965 | Bruinsma | 239/77 |
| 3,310,231 | 3/1967 | Wininger | 239/78 X |
| 3,321,137 | 5/1967 | Carter | 239/78 |
| 3,455,502 | 7/1969 | Pool et al. | 239/227 |
| 3,757,504 | 9/1973 | Rauth | 56/328 R |

*Primary Examiner*—John J. Love
*Assistant Examiner*—Michael Mar
*Attorney, Agent, or Firm*—Berman, Aisenberg & Platt

[57] ABSTRACT

A fruit harvesting machine consisting of a wheeled support on which is mounted a vertically extending housing containing a pair of transversely arranged blowers, one above the other, the housing having a laterally directed, vertically extending, laterally converging air collection chamber receiving air from the blowers and having a laterally facing discharge passage of substantial height. Movable air-guiding members are mounted in the discharge passage in a vertical array. In one embodiment, the members are louvers horizontally pivoted and linked together for simultaneous oscillating movement. Another embodiment uses a vertical crankshaft and drive linkages to oscillate the louvers. A further embodiment uses vertically pivoted oscillating louvers coupled by gears. A still further embodiment uses vertically journaled rotating apertured drums cooperating with an apertured fixed outlet wall on the mouth of the discharge passage to control the lateral discharge of the high pressure air from the discharge passage. Another embodiment employs inclined air-guiding discs mounted on a vertical rotating shaft. In each case, the lateral air discharge is of an intermittent nature tending to cause shaking or oscillation of a tree to cause fruit thereon to break loose from the tree as the machine is moved therepast.

15 Claims, 22 Drawing Figures

HARVESTING MACHINE

BACKGROUND OF THE INVENTION

1. Field of the Invention

This invention relates to harvesting machines, and more particularly to a fruit harvesting machine of the type providing intermittent air blasts against fruit trees to cause vibration or oscillation of the trees and thereby shake fruit loose therefrom.

2. The Prior Art

In modern citrus fruit plantations the trees are relatively close together and are arranged in rows. To harvest fruit from the trees, the most efficient procedure is to employ a machine which can move past the trees and cause them to shake or oscillate with proper amplitude and periodicity to cause the fruit thereon to become detached from the tree limbs and fall to the ground. Various machines for this purpose have been proposed, for example, machines providing traveling air blasts or air blasts which change in direction. In many cases, these have been found to be unsatisfactory, either because they damage the trees or do not provide the proper type of shaking action.

SUMMARY AND OBJECTS OF THE INVENTION

A main object of the present invention is to provide a novel and improved fruit harvesting machine of the air blast type which can be used in the manner above described and which provides a unique and highly effective tree-shaking action which avoids serious damage to the trees, which effectively detaches the fruit from the trees, and which is easy to operate.

A further object of the invention is to provide an improved fruit harvesting machine which provides intermittent periodic air blasts which can be controlled to furnish the optimum periodicity for oscillating the limbs of the trees in a manner to cause a maximum amount of fruit to be shaken loose therefrom as the machine is moved past the trees, the machine being relatively simple in construction, being easy to maintain in operating condition, and involving relatively inexpensive parts.

A still further object of the invention is to provide an improved fruit harvesting machine of the air blast type which inflicts minimum damage to the trees and the ground area adjacent thereto, which is economical to operate, which is controllable to provide proper tree limb oscillation as required for the type of fruit to be harvested, and which requires no mechanical contact with the trees but merely sufficient clearance to enable the machine to be moved past the trees in relatively close proximity thereto.

A still further object of the invention is to provide an improved fruit harvesting machine having means to furnish a vertical array of intermittent periodic air blasts which can be regulated to efficiently vibrate or oscillate the limbs of fruit trees in a manner to cause fruit to be shaken loose therefrom as the machine is moved past a row of such trees in relatively close proximity thereto, the machine comprising relatively few parts, being minimal in width to facilitate convenient access to the trees, and providing efficiently-directed air blasts, so that it is quite economical to operate as well as being highly effective in shaking fruit loose from the tree limbs.

These objects of the invention are achieved by providing an improved fruit harvester of the air blast type which has vertically distributed multiple-blower means to provide adequate blast pressure and which includes an air collection chamber for supplying the pressurized air to a vertical discharge duct of substantial height, of the same order of the trees to be harvested, the chamber being shaped to build up air velocity at the discharge duct, and the duct having means to discharge the air in intermittent blasts time-spaced so as to provide the required vibration or oscillation of the tree limbs for shaking the fruit therefrom.

BRIEF DESCRIPTION OF THE DRAWINGS

Further objects and advantages of the invention will become apparent from the following description and claims, and from the accompanying drawings, wherein:

DETAILED DESCRIPTION OF THE INVENTION

Referring to the drawings, and more particularly to FIGS. 1 to 6, 23 generally designates an improved fruit harvesting machine according to the present invention. The harvesting machine 23 comprises a main supporting frame 24 provided with supporting wheels 25, 25 and having a front hitch frame 26 including a conventional trailer hitch structure 27 which is pivotally connected to the hitch frame 26 at 28 for free rotation around a longitudinal horizontal axis. The trailer hitch structure 27 is adapted to be connected to the draw bar structure 29 of a tractor or other suitable pulling vehicle by suitable hitch pin means 30.

Longitudinally mounted on the rear portion of frame 24 is an internal combustion engine 31 whose output shaft is connected through a conventional clutch assembly 32 to a main driving shaft 33. The clutch assembly 32 is provided with a manually operable control handle 34 employed to couple and uncouple engine 31 to said main driving shaft 33.

Mounted on the forward portion of the supporting frame 24 is a vertically extending housing structure, shown generally at 35 comprising a pair of transversely arranged blower assemblies 36 and 37 arranged one above the other and rigidly connected together so that the housings of the blower assemblies 36 and 37 define the composite vertically extending housing structure 35. Thus, the composite housing structure 35 comprises the superimposed supporting housings of the blower assemblies 37 and 36.

The lower housing assembly 36 comprises spaced transversely extending housing plates 38 between which are secured the spirally shaped volute chamber 39 in which is journaled a conventional blower rotor 40 having a longitudinally extending shaft 41. Similarly, the upper blower assembly 37 comprises transversely extending spaced housing wall plates 42 between which is secured a generally spirally shaped volute chamber 43 in which is journaled the blower rotor 44 having the longitudinally extending shaft 45.

Figure 1:
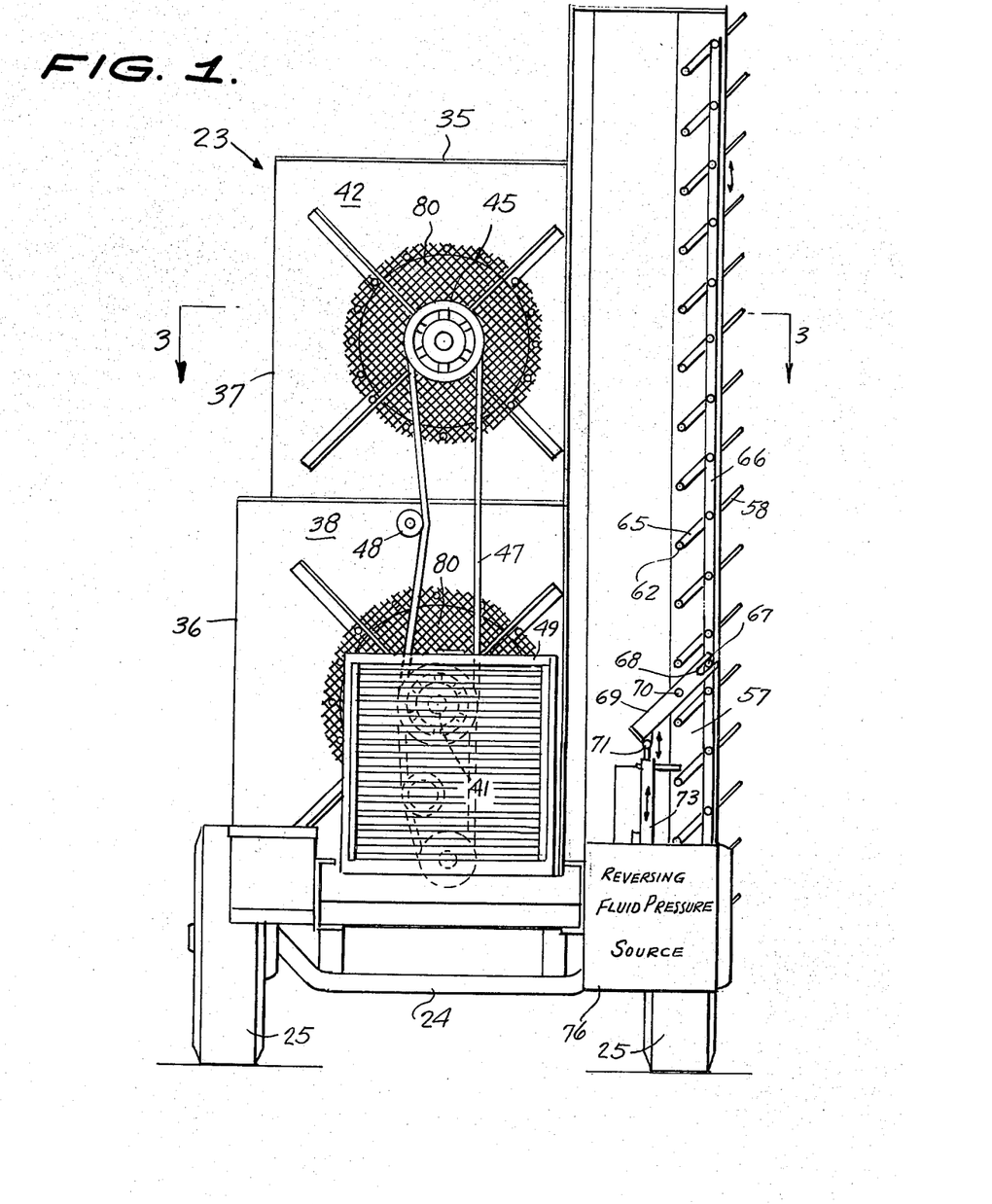
FIG. 1 is an end elevational view of an improved harvesting machine constructed in accordance with the present invention.
Figure 2:
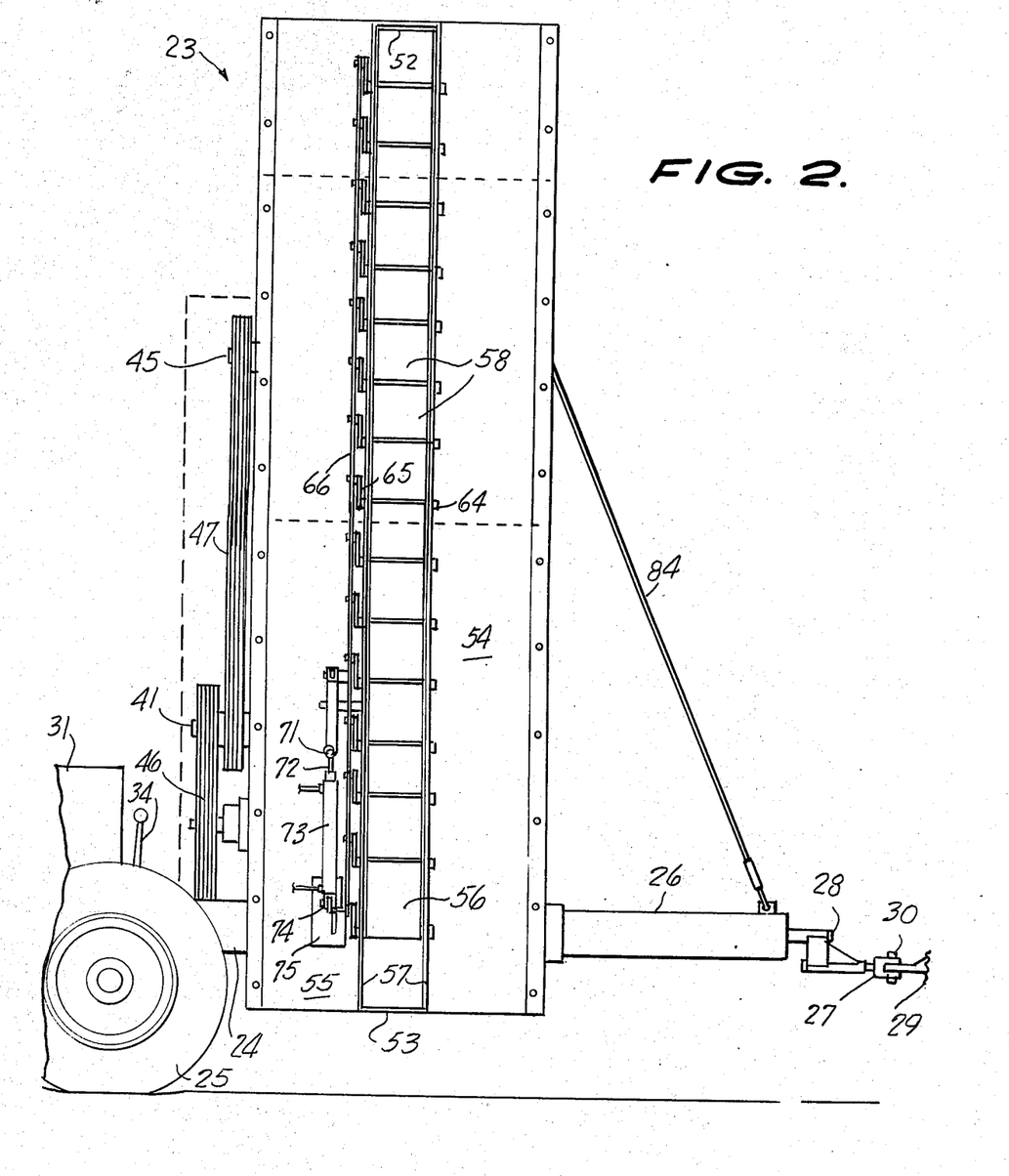
FIG. 2 is a fragmentary side elevational view of the machine shown in FIG. 1, showing the main components of the machine.

The driving shaft 33 is drivingly coupled by conventional pulleys and belts 46 to the blower shaft 41, and blower shaft 41 is similarly drivingly coupled by conventional pulleys and belts 47 to the upper blower driving shaft 45, as shown in FIG. 2. The respective sets of transmission belts 46 and 47 are maintained tight by means of suitable belt-engaging idler roller means, such as the idler roller element 48, shown in FIG. 1.

The internal combustion engine 31 is provided with a conventional radiator 49 for water-cooling the engine.

Designated at 50 is a vertically extending air chamber of substantial height having a main vertical wall 51, a top wall 52 and a bottom wall 53. The air chamber 50 is provided with the laterally converging front and rear walls 54 and 55 which merge with a laterally extending vertical air discharge passage 56. The vertical laterally directed air discharge passage 56 has the spaced parallel side walls 57, 57 connected at their top and bottom edges to the end portions of the air chamber top and bottom walls 52 and 53.

Figures 4, 5, 6, 7:
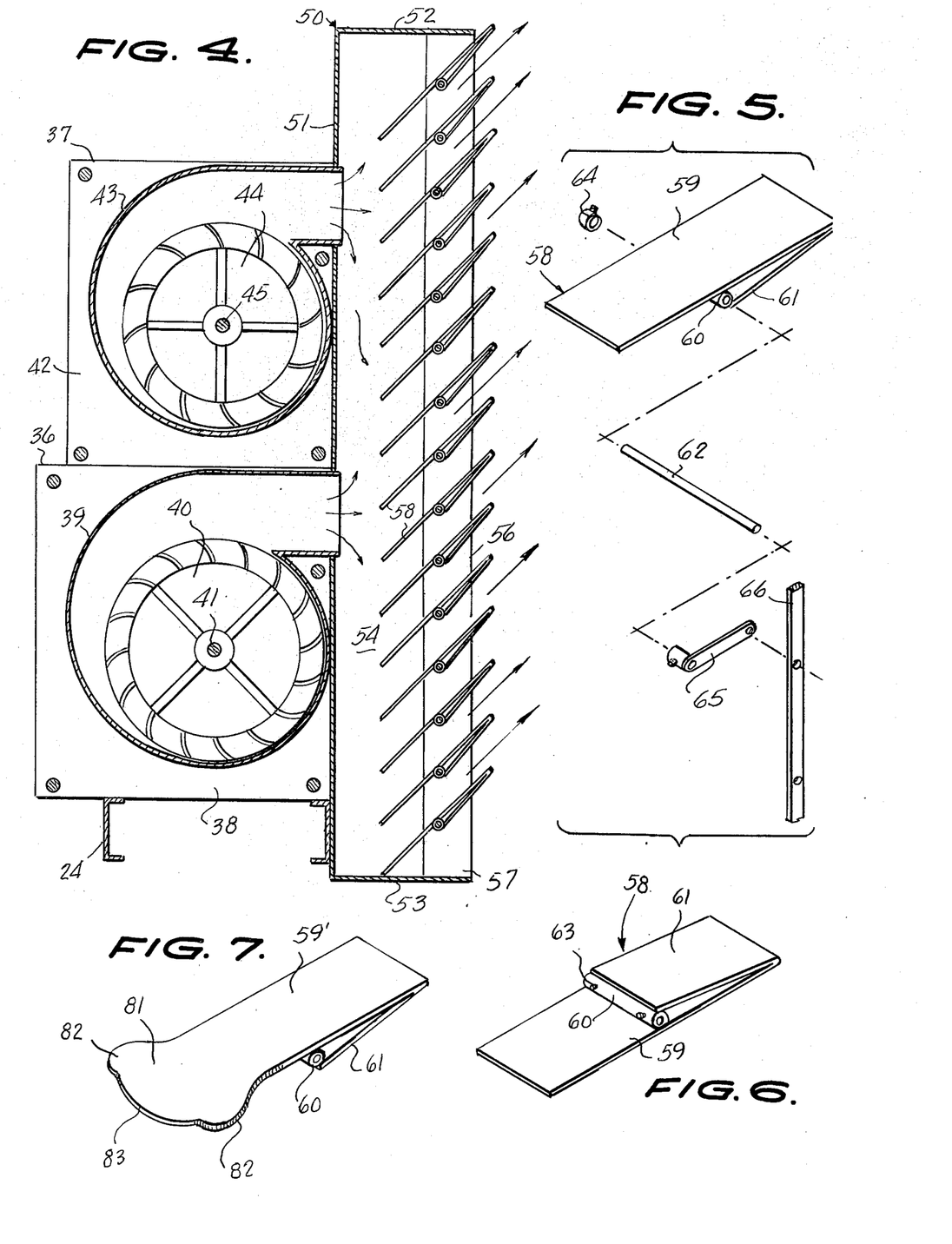
FIG. 4 is an enlarged fragmentary vertical cross-sectional view taken substantially on the line 4—4 of FIG. 1.
FIG. 5 is an enlarged perspective view showing one of the louver elements employed in the machine of FIGS. 1 to 4 and showing parts associated therewith, the louver end parts being shown in separated positions.
FIG. 6 is a bottom perspective view of the louver element shown in FIG. 5.
FIG. 7 is a perspective view of a modified form of louver element which may be employed in the machine of FIGS. 1 to 6.

The discharge ends of the volute housings 39 and 43 extend through and are rigidly secured to the vertical wall 51 of the air chamber 50, as shown in FIG. 4.

A plurality of evenly spaced louver members 58 are pivotally mounted between the parallel walls 57, 57 of the discharge passage 56 on vertically aligned longitudinally extending horizontal axes, as shown in FIG. 4. Each louver member 58 comprises a generally rectangular main plate member 59 to the bottom mid-portion of which is transversely secured a bearing sleeve member 60, as by welding, or the like. A sloping bottom plate 61 is rigidly secured to the bottom portion of each bearing sleeve 60 and the outer edge of the associated main louver plate 59, as shown in FIGS. 5 and 6, to define a flaring outward passage between adjacent louver elements when the louver elements 58 are arranged in parallelism in the manner illustrated in FIG. 4.

Figure 3:
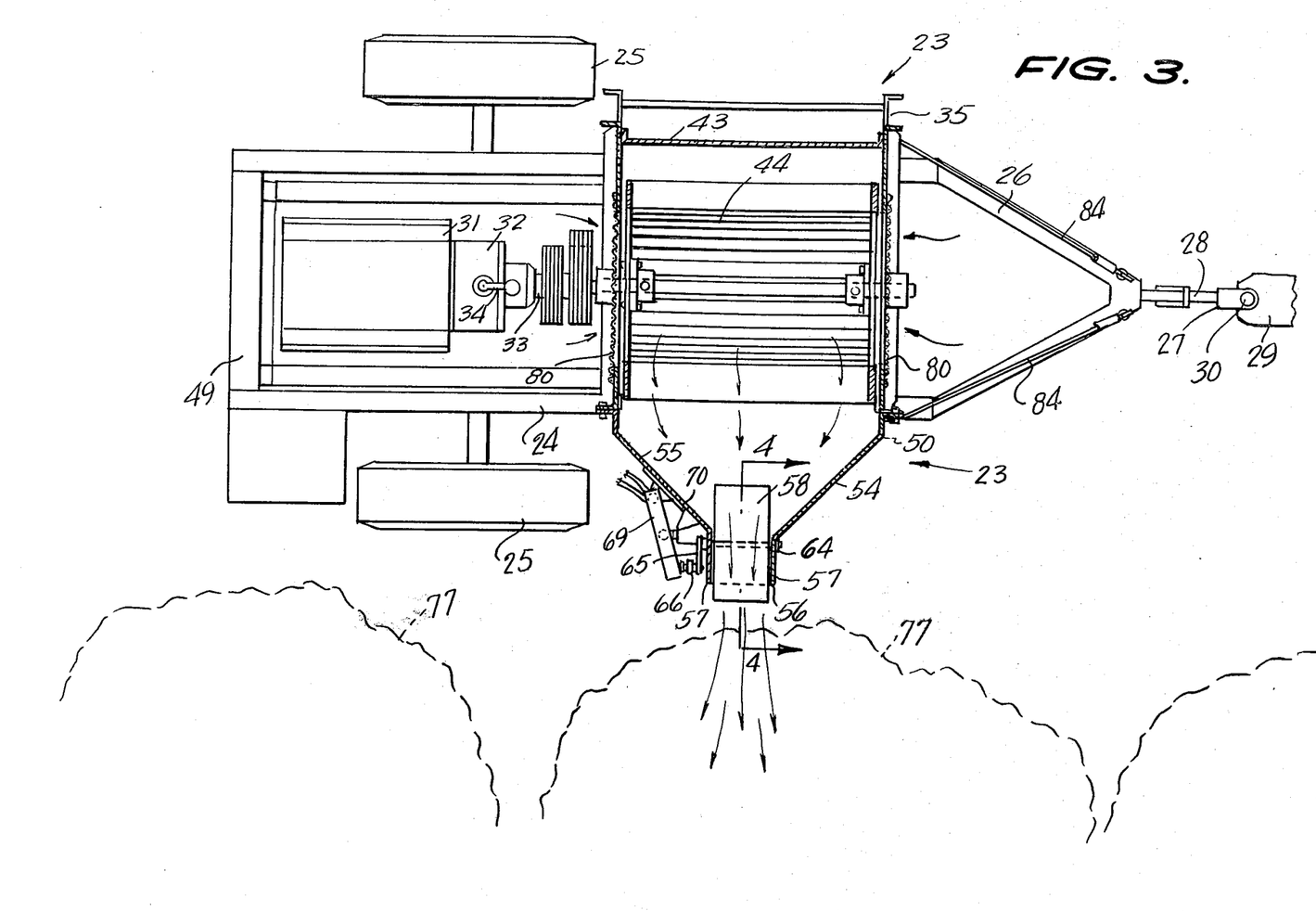
FIG. 3 is a horizontal cross-sectional view taken substantially on the line 3—3 of FIG. 1.

Extending rotatably through the vertical walls 57 are respective shaft members 62 which extend through the louver sleeve members 60. The sleeve members 60 are provided with set screws 63 for lockingly securing the louver members to their associated supporting shafts 62. Retaining collars 64 are secured on the forward ends of the shafts 62 externally adjacent the discharge passage wall 57. Connected to the externally projecting rear ends of the shafts 62 are respective link arms 65 which are in turn connected at their outer ends to a common vertical link bar 66 located adjacent and parallel to the rear discharge passage wall 57, as shown in FIG. 3.

The vertical link bar 66 is provided at a lower portion thereof with a drive pin 67 which is slidably engaged in the end slot 68 of a driving lever 69 pivoted at 70 to the adjacent air discharge passage wall 57, as shown in FIG. 1. The inner end of the drive lever 69 is pivotally connected at 71 to the top end of the piston rod 72 of a hydraulic cylinder 73 whose lower end is pivotally connected at 74 to a suitable bracket 75 mounted on the air chamber wall 55.

The piston rod 72 is reciprocated by furnishing cylinder 73 with periodically reversing hydraulic fluid from a suitable source of reversing hydraulic fluid, shown diagrammatically in FIG. 1 at 75. As will be readily understood, any suitable well known means may be provided for driving the lever 69 in an oscillating fashion so as to correspondingly oscillate the louver members 58.

As will be seen from FIG. 4, the louver members 58 are spaced so as to define air passages therebetween whose direction is changed as the louver members rotate. Thus, with the parallel arrangement of louver members shown in FIG. 4, the air pressure built up in the chamber 50 by the operation of the blowers 36 and 37 causes blasts of air to be directed outwardly through the louvers, and as the louvers are oscillated by the reciprocation of the piston rod 72, the emerging blasts of air travel vertically so that a given area of a tree adjacent the discharge outlet 56 experiences intermittent air blasts at a frequency corresponding to the frequency of oscillation of the louver members 58.

Thus, in operation, as the machine 23 is moved past a row of fruit trees 77, the air blasts impinging on the trees cause the limbs of the trees to be blown inwardly, and these limbs are deflected inwardly at a frequency selected to cause the fruit on the limbs to become detached therefrom, due to the inertia of the fruit. Therefore, as the machine moves past a tree 77, it applies intermittent air blasts to the various areas of the tree carrying fruit, causing the fruit to become detached from the limbs.

It will be noted that the pattern of blast sequence provided by the above-described machine can be varied by adjusting the various louver members 58 on their shafts 62, since the set screws 63 allow for desired angular adjustments of the louver members 58 on their shafts.

It will be further noted from FIG. 3 that the machine can be moved along a row of trees 77 and that the vertical arrangement of the air chamber assembly 50 and the pivoted louver members 58 in the outlet passage of the air chamber provides alignment of the air blasts with the rows of tree growth so that the action of the air blasts will be substantially complete and will achieve maximum detachment of fruit from the tree limbs. It will be further noted that the blower assemblies have transversely arranged intake screens 80 which allow air from the atmosphere to be drawn into the volute chambers 39, 43 to be compressed and driven outwardly by the rotors 44, 40 into the wide portion of the air chamber 50 to build up air pressure therein. The compressed air is released through the vertical discharge passage 57 after being guided thereto by the outwardly convergent walls 54, 55, whereby the compressed air discharges between the outlet passage walls 57, 57 with substantially increased velocity, being guided between the oscillating louver members 58. Thus, the jets emerging from between the louvers contain a substantial amount of kinetic energy which is employed in periodically driving back the fruit-laden limbs of the trees 77 as the machine passes the trees, thereby causing the fruit to be detached therefrom because of its relatively large inertia.

FIG. 7 illustrates a modification of the shape of the louver members which may be employed in the machine of FIGS. 1 to 6, and which are interchangeable with the previously described louver members 58. The modified louvers, such as that shown in FIG. 7, comprise main flat body portions 59', including the bearing sleeves 60 secured transversely thereto and braced by the inclined auxiliary plate member 61, similar to the louver shown in FIG. 6, but are provided with flaring inwardly extending end portions 81 which are shaped to generally conform with the inside shape of the space defined between the outwardly convergent vertical wall members 54, 55, and the modified louvers are substantially greater in length than the louver members 58. As shown in FIG. 7, the enlarged inner end portions are provided with curved inner corners 82, 82 to facilitate the pivotal movement of the louvers and to prevent interference with the walls 54, 55 as the louvers swing. The inner end portion of the modified louver of FIG. 7 is provided with an inwardly arcuately curved intermediate edge portion 83 which merges smoothly with the rounded corners 82, 82. The modified louvers such as that shown in FIG. 7 provide improved control of the air jets directed therebetween because of their improved fit within the convergent vertical wall members 54, 55.

It will be further noted that both in the case of the louvers of FIGS. 1 to 6 and FIG. 7, the sloping auxiliary bottom plate portions 61 provide a degree of divergency between the outer portions of the adjacent louvers to thereby introduce a desired amount of spread of the air jets emerging between the louvers, thereby insuring a certain amount of overlap of the emerging air jets, which has been found to substantially improve the harvesting efficiency of the machine. Also, as will be readily apparent, the use of the sloping bottom plates 61 greatly increases the mechanical rigidity and strength of the louver members.

It is to be noted that the assembly 23 is rigidly held in its upright vertical position in any suitable manner, being securely fastened at its lower portion to the vehicle frame 24 and being braced with respect to the hitch frame 26 by tie-rods or cables 84 connecting the upper forward corner portions of the housing assembly 23 to the apex portion of the hitch frame 26, as shown in FIGS. 2 and 3.

Figure 8:
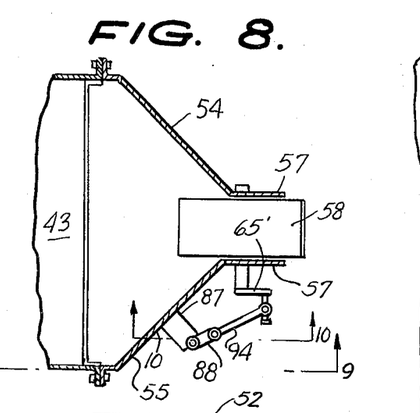
FIG. 8 is a horizontal cross-sectional view taken through the air outlet portion of a modified form of harvesting machine according to the present invention, said view being taken substantially on the line 8—8 of FIG. 9.
Figure 9:
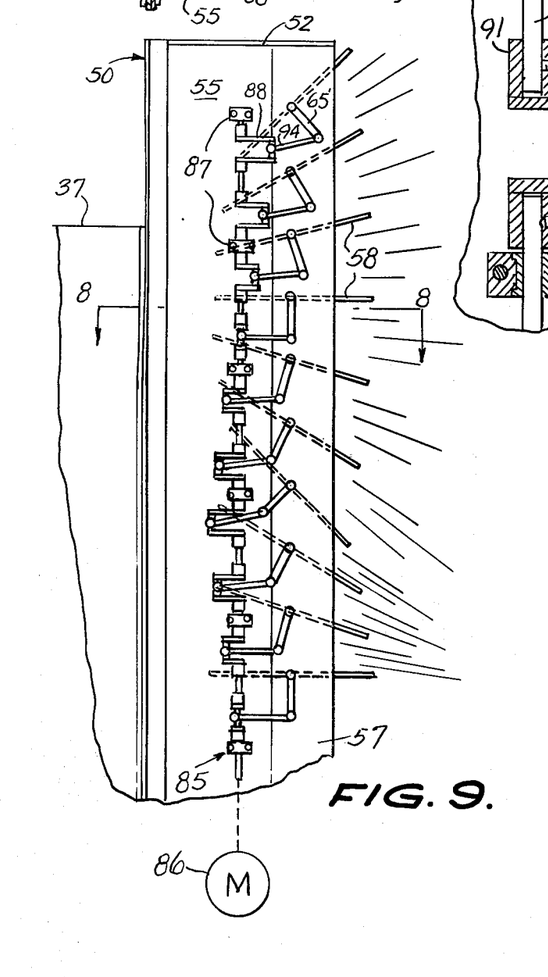
FIG. 9 is a fragmentary elevational view of a portion of the modified harvesting machine of FIG. 8, said view being taken substantially on the line 9—9 of FIG. 8.
Figure 10:
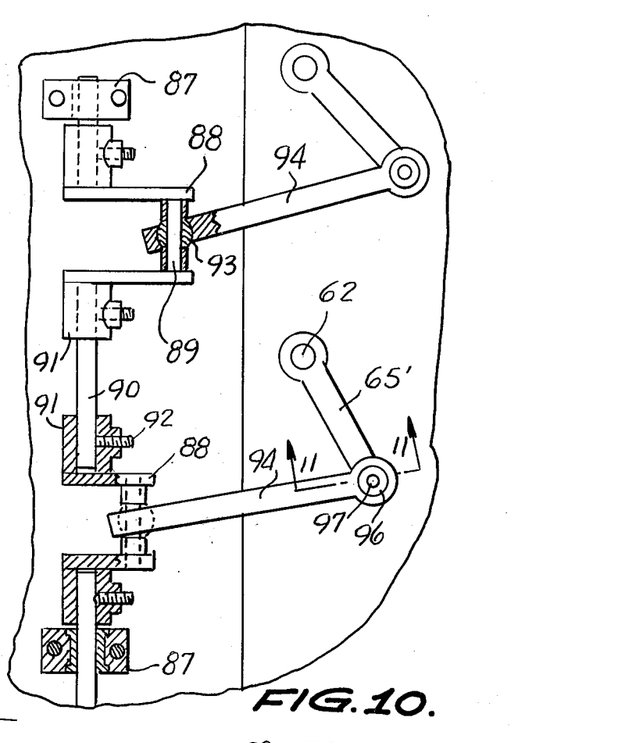
FIG. 10 is an enlarged fragmentary vertical cross-sectional view taken substantially on the line 10—10 of FIG. 8.

FIGS. 8 to 11 show a modification of the harvesting machine of the present invention wherein the louver members 58 are oscillated by a vertically mounted crankshaft assembly, shown generally at 85, journaled vertically on the air chamber wall portion 55. The crankshaft assembly 85 is driven continuously by a suitable motor 86, for example, a hydraulic motor, suitably mounted on the frame 24 of the machine subjacent the housing assembly 50, as is diagrammatically illustrated in FIG. 9. The crankshaft assembly 85 comprises a plurality of vertically extending axially aligned crankshaft elements journaled in bearing blocks 87 secured to wall 55 and connected by cranks 88 having vertical driving wrist pins 89, as shown in FIG. 10. For example, a pair of adjacent cranks 88 are drivingly connected together by a short shaft section 90, the ends of the shaft section engaging in connection collars 91 of the cranks and being rigidly secured thereto by set screws 92 engaged through the collars 91 in the manner illustrated in FIG. 10. The bearing blocks 87 extend sufficiently away from the wall 55 to permit free rotation of the cranks 88, as shown in FIG. 8.

Figure 11:
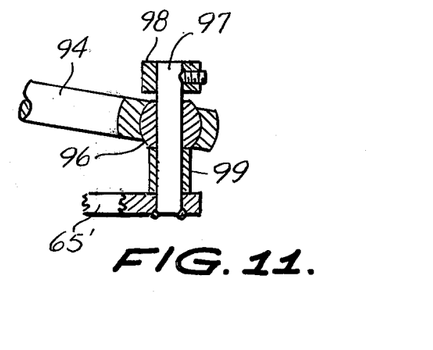
FIG. 11 is an enlarged fragmentary cross-sectional view taken substantially on the line 11—11 of FIG. 10.

Pivotally connected to each wrist pin element 89 by a universal ball joint assembly 93 is a crank rod 94 whose end is similarly connected to a louver operating arm 65' by universal ball joint connection 96, as shown in FIG. 11. Thus, each louver drive arm 65' is provided with a perpendicularly extending end drive pin 97 connected to a crank arm 94 by a universal ball joint assembly 96, as shown in FIG. 11, each pin 97 being provided with a retaining collar 98. A spacer sleeve 99 is provided on the drive pin 97 between the louver drive arm 65' and the universal ball element of the ball joint assembly 96.

In operation, rotation of the crankshaft assembly 85 causes the wrist pin elements 89 to oscillate the drive arms 65' by crank action, so that the louver members 58 are correspondingly oscillated. The louver members 58 may be adjusted to provide any desired air blast pattern, as above mentioned, and are not necessarily arranged parallel to each other. For example, FIG. 9 shows a typical variation of the louver members 58 from parallelism which may be employed in accordance with particular harvesting conditions. As in the previously described embodiment of the invention, the continuous oscillation of the louver members 58 provides laterally directed air discharge blasts of an intermittent nature tending to cause shaking or oscillation of the fruit-laden tree limbs as the machine is moved therepast, to cause the fruit thereon to break loose from the tree.

Figure 12:
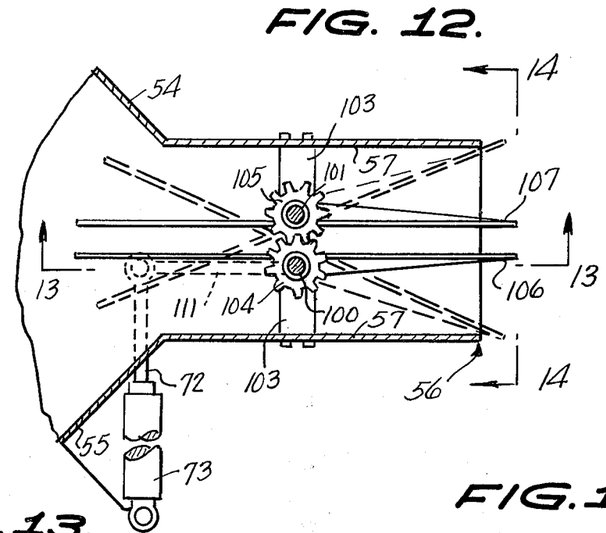
FIG. 12 is a horizontal cross-sectional view taken through the air outlet duct portion of another modification of the improved harvesting machine of the present invention, said view being taken substantially on the line 12—12 of FIG. 14.

According to further embodiments of the present invention, the air-guiding members are rotatably mounted for vertical axis rotation between the passage-defining walls 57, 57. Thus, referring to FIGS. 12 to 14, a pair of spaced vertical rotary shafts 100 and 101 are rotatably mounted between the walls 57, 57 in a common vertical plane transverse to said walls and located at the intermediate portion of the laterally directed discharge passage 56, the shafts being rotatably held by means of suitable bearing brackets, such as the spaced bearing brackets 103 which are secured to and extend horizontally inwardly from the respective side walls 57, 57. The shafts 100, 101 are gearingly coupled together by means of meshing gears 104, 105 secured on the respective shafts, as shown in FIGS. 12 and 14. Vertical louver members 106 and 107 are secured on the shafts 100, 101 in alternating relationship, as shown in FIG. 14. The vertical shaft 100 is oscillated by reciprocating drive means, such as the reciprocating piston rod 72 of a reversibly driven fluid pressure cylinder 73, similar to that employed in the embodiment of FIGS. 1 to 6. In operation, when the shaft 100 is oscillated by the action of the reversibly driven fluid pressure cylinder 73, the coupled shaft 101 is correspondingly oscillated in reverse direction. Thus, the vertical louver members are oscillated in opposite directions from the dotted view positions thereof shown in FIG. 12 to opposite dotted view positions, namely, between positions substantially engaging the front vertical edges of the walls 57, 57, thereby providing the periodic intermittent laterally directed air blasts at the various levels of the vertical discharge passage 56, whereby to deflect the limbs of a tree as the machine is moved past the tree in proximity thereto and to cause fruit on said limbs to become detached from the limbs.

As shown in FIG. 3, the respective vertical louvers 106, 107 are provided with substantially centered supporting sleeves 108 receiving the associated shafts 100, 101, and being adjustably secured thereto by set screws 109. As in the previously described embodiments of the invention, the forward portions of the louvers are preferably outwardly tapered in cross-sectional shape at their outer end portions, for example, by the provision of sloping outer brace plates 110 rigidly secured to the supporting sleeves 108 and the outer edges of the louvers.

Figure 13:
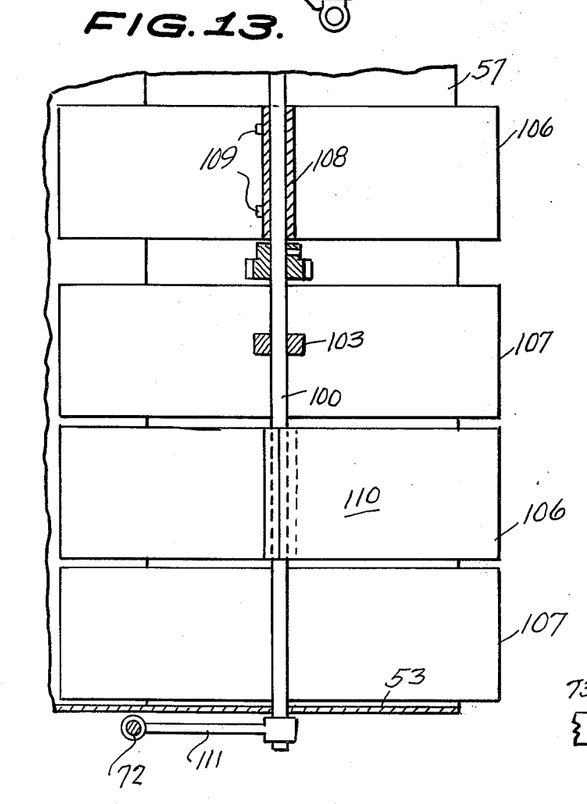
FIG. 13 is a fragmentary vertical cross-sectional view taken substantially on the line 13—13 of FIG. 12.
Figure 14:
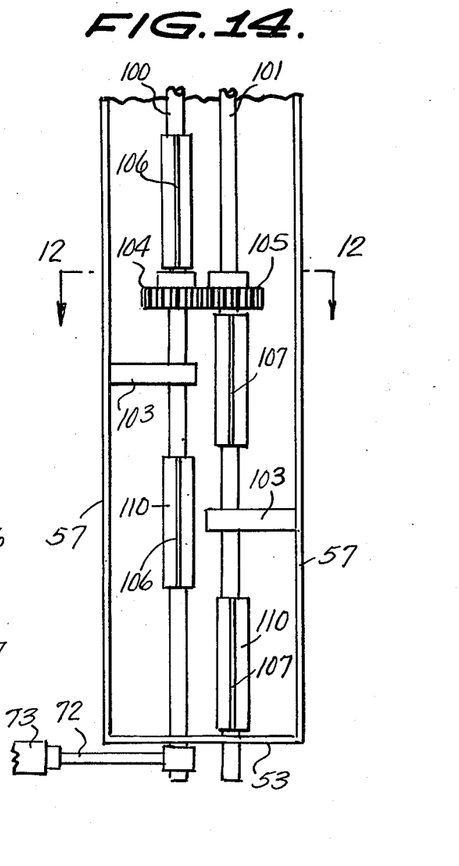
FIG. 14 is a fragmentary elevational view taken substantially on the line 14—14 of FIG. 12.
Figure 15:
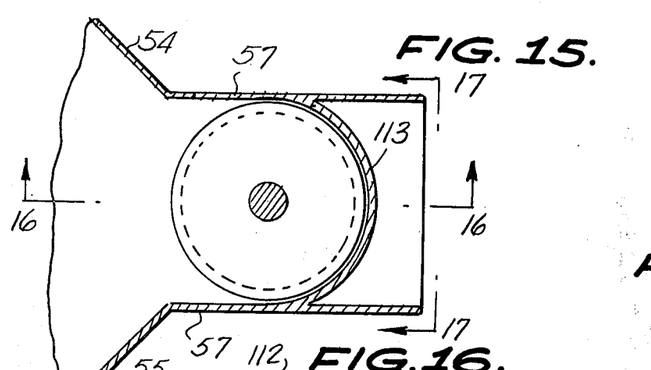
FIG. 15 is a horizontal cross-sectional view taken through the blast outlet portion of still another form of harvesting machine according to the present invention, said view being taken substantially on the line 15—15 of FIG. 16.

As will be seen from FIGS. 13 and 14, the reciprocating piston 72 is drivingly connected to the vertical shaft 100 by a link arm 111 which is rigidly secured to the shaft 100 and which is pivotally connected by a suitable pivot joint to the end of the piston rod 72. The driving cylinder 73 is pivotally connected to the supporting frame of the vehicle in any suitable manner so as to allow free reciprocation of the piston rod 72 during the operation of the fluid pressure cylinder 73.

Figure 16:
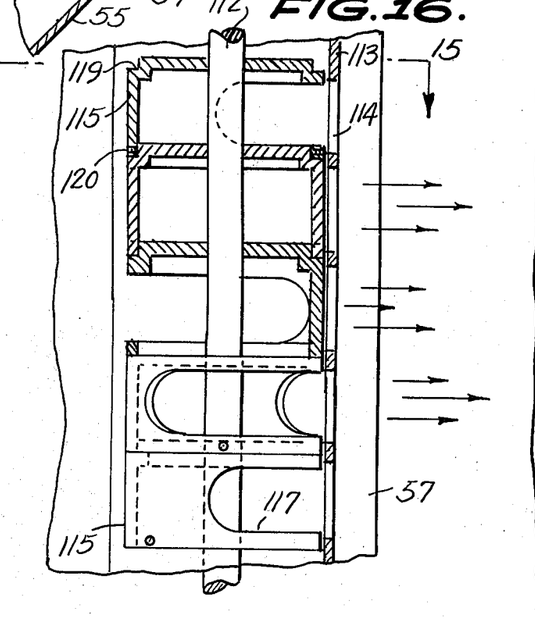
FIG. 16 is a fragmentary vertical cross-sectional view taken substantially on the line 16—16 of FIG. 15.
Figure 17:
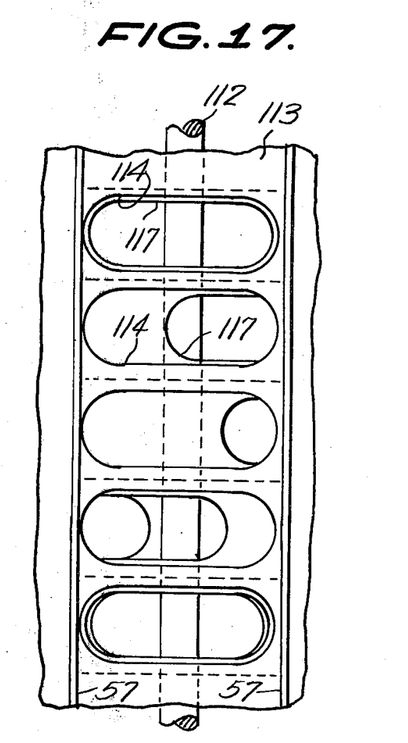
FIG. 17 is a fragmentary elevational view taken substantially on the line 17—17 of FIG. 15.
Figure 18:
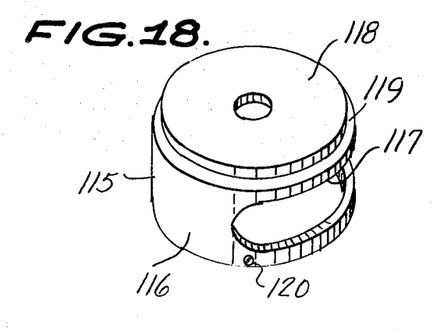
FIG. 18 is an enlarged perspective view of one of the apertured drum elements employed in the embodiment of FIGS. 15 to 17.

FIGS. 15 to 18 illustrate another form of the invention wherein the air-guiding members are rotatably mounted for vertical axis rotation between the passage-defining walls 57, 57. In this embodiment, a vertical shaft 112 is suitably journaled midway between the vertical passage walls 57, 57 and is driven by a suitable motor, for example, a hydraulic motor, not shown. The lateral discharge passage defined by the walls 57, 57 is provided with an arcuately curved end wall 113 which is cylindrically curved concentrically with the axis of the shaft 112 and which is formed with evenly spaced horizontal slots or apertures 114 arranged in a vertical array adjacent the vertical discharge opening of the machine. Secured on the shaft 112 are an array of apetured hollow drum members 115, each drum member having a cylindrical main wall portion 116 formed with a horizontal slot 117 and having a circular top wall 118, with a peripheral recess 119 at its top end. Thus, the successive drums 115 are fitted over each other with their bottom end portions engaging in the peripheral recesses 119 of the subjacent drums. Set screws 120 are provided in the lower marginal portions of the walls 116 which preferably engage the inner wall portions of the recesses 119 of the subjacent drums, as illustrated in FIG. 16, to lock the drums together with their slots 117 in angularly spaced relationship to each other, and the lowermost drum may be rigidly secured to the shaft 112 in any suitable manner so that the stack of drums is driven simultaneously with the rotation of the shaft 112. As will be seen from FIG. 17, the orientations of the slots 117 may be suitably staggered or axially spaced around the axis of shaft 112 the desired type of intermittent blast action. The slots 117 are located so as to be registrable with the respective horizontal fixed slots 114 of the closure wall 113 and to become sealed as the drums 115 rotate with varying degrees of closure of the slots 114 in the manner shown in FIG. 17. Thus, as the shaft 112 is rotated by the driving motor, periodic intermittent laterally directed air blasts at the various levels of the vertical discharge passage of the machine are provided, whereby to deflect the limbs of a tree as the machine moves past the tree in proximity thereto and to cause fruit on said limbs to become detached from the limbs.

Figure 19:
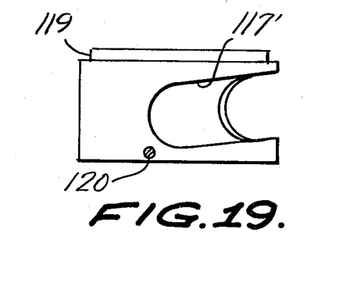
FIG. 19 is an elevational view of a modified form of apertured drum element which may be employed in the form of the invention shown in FIGS. 15 to 17.

The escape slots of the drums may have any desirable configuration, for example, may be inclined in the manner shown at 117' in FIG. 19 to thereby alter the discharge jet action, since this will modify the cross-sectional area of the discharge jets as the drums rotate in view of the horizontal orientation of the associated fixed slots 114 in the outlet wall 113.

Figure 20:
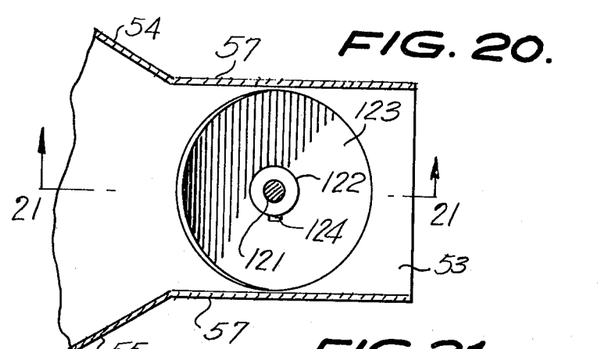
FIG. 20 is a horizontal cross-sectional view taken through the outlet duct portion of still another form of harvesting machine according to the present invention, said view being taken substantially on the line 20—20 of FIG. 21.
Figure 21:
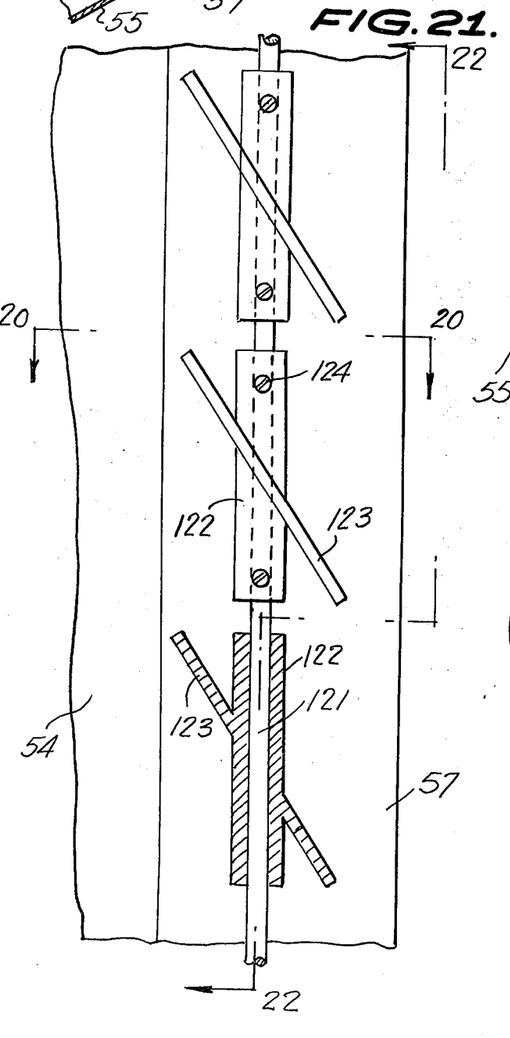
FIG. 21 is a vertical cross-sectional view taken substantially on the line 21—21 of FIG. 20.
Figure 22:
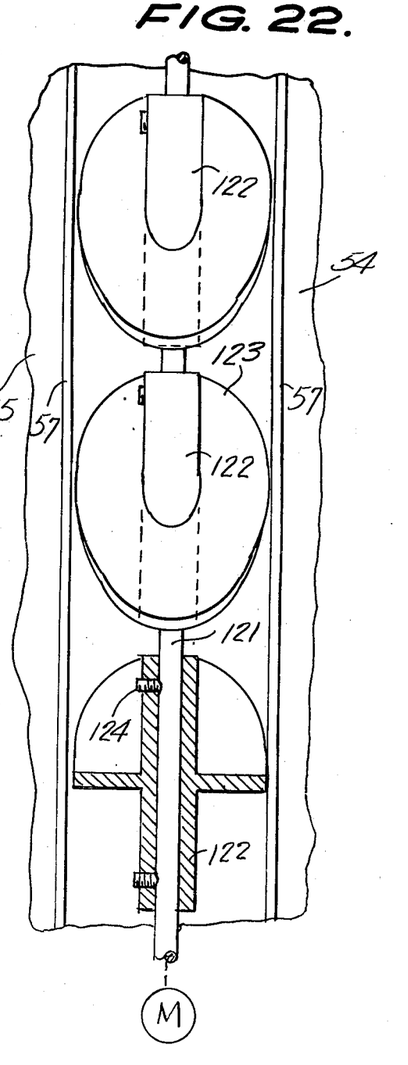
FIG. 22 is a fragmentary vertical cross-sectional view taken substantially on the line 22—22 of FIG. 21.

FIGS. 20 to 22 illustrate another form of the present invention wherein the air-guiding members are rotatably mounted for vertical axis rotation between the passage-defining walls 57, 57. In this form of the invention, a vertical shaft 121 is rotatably mounted in the intermediate portion of the air-discharge passage defined between the walls 57, 57 and is suitably driven, for example, by a hydraulic motor, as in the previously-described form of the invention of FIGS. 15 to 18. In the embodiment of FIGS. 20 to 22, a plurality of supporting sleeves 122 are adjustably secured on the shaft 121 and each supporting sleeve has rigidly secured thereon an inclined louver member 123 which is generally oval in shape. The louver members 123 may be arranged in parallel relationship, as shown in FIG. 21, or alternatively, may be adjusted so that they are skewed relative to each other. In the parallel arrangement specifically shown in FIG. 21, rotation of the shaft 121 in the operation of the machine will provide uniformly acting periodic air blasts at the various levels of the vertical discharge passage, similar to those obtained with the previously described embodiments of the invention, the periodic intermittent laterally directed air blasts acting to deflect the limbs of a tree as the machine is moved therepast in proximity thereto and to cause fruit on said limbs to become detached from the limbs. By varying the relative orientations of the louver members 123, for example, by adjusting them so as to be skewed relative to each other, variations in the pattern of air blast may be provided, for example, for specific distribution of the limbs to be agitated or for other conditions which may arise in the harvesting process. As will be readily apparent, it is relatively easy to change the orientations of the louver members 123, since the sleeve members 122 are adjustably secured to the shaft 121 by means of set screws 124, as shown in FIG. 22, which can be easily loosened to allow rotational adjustment of the associated louver members 123 around the axis of the shaft 121, and allowing the louver members to be locked in adjusted positions by tightening the set screws 124.

It will be noted that in the various modifications of the invention above described, the louvers and associated parts are arranged so that they are in line with the rows of tree growth, and can be readily moved along rows of trees so as to remove the fruit therefrom with a high degree of efficiency. It will be further noted that the machine can be used not only for harvesting fruit from citrus trees, but for various other types of trees from which the fruit is to be removed.

While certain specific embodiments of the present invention have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A harvesting machine comprising a mobile support, vertically extending housing means mounted on said support, said housing means including a laterally extending vertical air chamber having a vertically extending inner wall, laterally convergent vertical side walls extending from the side edges of said inner wall, and a laterally directed vertical discharge passage merging with said laterally convergent side walls, said housing means further including a plurality of vertically spaced air blower means communicatively connected with said vertical air chamber through said inner wall, spaced air-guiding members movably mounted in said discharge passage in a vertical array, and means to simultaneously move said air-guiding members in a manner to provide periodic intermittent laterally directed air blasts at the various levels of said vertical discharge passage, whereby to deflect the limbs of a tree as the machine is moved past the tree in proximity thereto and to cause fruit on said limbs to become detached from the limbs.

2. The harvesting machine of claim 1, and wherein said air blower means comprises a plurality of volute-shaped blower housings mounted one above the other, and respective blower rotors operatively mounted substantially axially in said volute-shaped blower housings, said blower housings including respective vertically-spaced discharge ducts communicatively connected with the vertical air chamber at said inner wall.

3. The harvesting machine of claim 1, and wherein said laterally directed vertical discharge passage has parallel passage-defining walls, and wherein said air-guiding members are rotatably mounted between said passage-defining walls.

4. The harvesting machine of claim 3, and wherein said air-guiding members are mounted on horizontal axes of rotation.

5. The harvesting machine of claim 4, and wherein said air-guiding members comprise vertically spaced louvers, and wherein the means to simultaneously move said air-guiding members comprises means to periodically oscillate the louvers.

6. The harvesting machine of claim 5, and wherein the means to simultaneously move said air-guiding means comprises respective arms drivingly connected to the louvers and a common vertical link bar connected to said arms, and wherein the means to oscillate the louvers comprises means to reciprocate said vertical link bar.

7. The harvesting machine of claim 6, and wherein the means to reciprocate the vertical link bar comprises reversible fluid pressure-operated cylinder means and drive lever means interconnecting said cylinder means and said vertical link bar.

8. The harvesting machine of claim 5, and wherein the means to simultaneously move said air-guiding louvers comprises respective arms drivingly connected to the louvers, vertical crank shaft means journaled on the air chamber, and crank rod means drivingly connecting said crank shaft means to the louver arms.

9. The harvesting machine of claim 1, and wherein said laterally directed discharge passage has parallel vertical passage-defining walls, and wherein said air-guiding members are rotatably mounted for vertical axis rotation between said passage-defining walls.

10. The harvesting machine of claim 1, and wherein said vertical laterally directed discharge passage is provided with a vertical rotary supporting shaft and said air-guiding members comprise inclined louver members mounted one above the other on said vertical rotary shaft, and wherein the means to move the air-guiding members comprises means to rotate said vertical shaft.

11. A harvesting machine comprising a mobile support, a vertically extending housing means mounted on said support, said housing means including a laterally extending vertical air chamber having a vertically extending inner wall, laterally convergent vertical side walls extending from the side edges of said inner wall, and a laterally directed vertical discharge passage merging with said laterally convergent side walls, said housing means further including air blower means communicatively connected with said vertical air chamber through said inner wall, spaced air-guiding members movably mounted in said discharge passage in a vertical array, and means to simultaneously move said air-guiding members in a manner to provide periodic intermittent laterally directed air blasts at the various levels of said vertical discharge passage, whereby to deflect the limbs of a tree as the machine is moved past the tree in proximity thereto and to cause fruit on said limbs to become detached from the limbs, wherein said laterally directed vertical discharge passage has parallel passage-defining walls, wherein said air-guiding members are rotatably mounted between said passage-defining walls, wherein the air guiding members are mounted on horizontal axes of rotation, wherein said air-guiding members comprise vertically spaced louvers, wherein the means to simultaneously move said air-guiding members comprises means to periodically oscillate the louvers, and wherein said louvers have inner portions which flare inwardly in width and wherein the inwardly flaring louver portions are received between the laterally convergent side walls of the air chamber.

12. A harvesting machine comprising a mobile support, vertically extending housing means mounted on said support, said housing means including a laterally extending vertical air chamber having a vertically extending inner wall, laterally convergent vertical side walls extending from the side edges of said inner wall, and a laterally directed vertical discharge passage merging with said laterally convergent side walls, said housing means further including air blower means communicatively connected with said vertical air chamber through said inner wall, spaced air-guiding members movably mounted in said discharge passage in a vertical array, and means to simultaneously move said air-guiding members in a manner to provide periodic intermittent laterally directed air blasts at the various levels of said vertical discharge passage, whereby to deflect the limbs of a tree as the machine is moved past the tree in proximity thereto and to cause fruit on said limbs to become detached from the limbs, wherein said laterally directed vertical discharge passage has parallel-defining walls, wherein said air-guiding members are rotatably mounted between said passage-defining walls, wherein said air-guiding members are mounted on horizontal axes of rotation, wherein said air-guiding members comprise vertically spaced louvers, wherein the means to simultaneously move said air-guiding members comprises means to periodically oscillate the louvers, and wherein the louvers are outwardly tapered in cross-sectional shape at their outer end portions.

13. A harvesting machine comprising a mobile support, vertically extending housing means mounted on said support, said housing means including a laterally extending vertical air chamber having a vertically extending inner wall, laterally convergent vertical side walls extending from the side edges of said inner wall, and a laterally directed vertical discharge passage merging with said laterally convergent side walls, said housing means further including air blower means communicatively connected with said vertical air chamber through said inner wall, spaced air-guiding members movably mounted in said discharge passage in a vertical array, and means to simultaneously move said air-guiding members in a manner to provide periodic intermittent laterally directed air blasts at the various levels of said vertical discharge passage, whereby to deflect the limbs of a tree as the machine is moved past the tree in proximity thereto and to cause fruit on said limbs to become detached from the limbs, wherein said laterally directed discharge passage has parallel vertical passage-defining walls, wherein said air-guiding members are rotatably mounted for vertical axis rotation between said passage-defining walls, and wherein said air-guiding members comprise vertical louvers.

14. The harvesting machine of claim 13, and wherein said laterally directed discharge passage is provided with a pair of spaced vertical rotary shafts and said louvers are mounted alternately on said shafts, wherein means are provided gearingly coupling said shafts, and wherein the means to simultaneously move the air-guiding members comprises means to oscillate one of said vertical rotary shafts.

15. A harvesting machine comprising a mobile support, vertically extending housing means mounted on said support, said housing means including a laterally extending vertical air chamber having a vertically extending inner wall, laterally convergent vertical side walls extending from the side edges of said inner wall, and a laterally directed vertical discharge passage merging with said laterally convergent side walls, said housing means further including air blower means communicatively connected with said vertical air chamber through said inner wall, spaced air-guiding members movably mounted in said discharge passage in a vertical array, and means to simultaneously move said air-guiding members in a manner to provide periodic intermittent laterally directed air blasts at the various levels of said vertical discharge passage, whereby to deflect the limbs of a tree as the machine is moved past the tree in proximity thereto and to cause fruit on said limbs to become detached from the limbs, and wherein said laterally directed discharge passage has an outer end wall provided with vertically spaced apertures and said air-guiding members comprise apertured hollow drum members mounted for vertical rotation inwardly adjacent said outer end wall with the apertures of the drum members angularly spaced relative to each other, sadi drum members being provided with a common axial vertical rotary supporting shaft, and wherein the means to move the air-guiding members comprises means to rotate said vertical supporting shaft.

* * * * *